US006986101B2

(12) United States Patent
Cooper et al.

(10) Patent No.: US 6,986,101 B2
(45) Date of Patent: Jan. 10, 2006

(54) METHOD AND APPARATUS FOR CONVERTING PROGRAMS AND SOURCE CODE FILES WRITTEN IN A PROGRAMMING LANGUAGE TO EQUIVALENT MARKUP LANGUAGE FILES

(75) Inventors: Michael Richard Cooper, Austin, TX (US); Rabindranath Dutta, Austin, TX (US); Kelvin Roderick Lawrence, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 09/306,189

(22) Filed: May 6, 1999

(65) Prior Publication Data

US 2003/0121000 A1 Jun. 26, 2003

(51) Int. Cl.
*G06F 17/00* (2006.01)

(52) U.S. Cl. ....................... 715/513; 715/523; 707/104

(58) Field of Classification Search ................ 707/102, 707/103, 104.1, 513, 523, 101, 104; 715/513, 715/523; 717/143, 136, 137
See application file for complete search history.

(56) References Cited

U.S. PATENT DOCUMENTS

| | | | | |
|---|---|---|---|---|
| 5,848,386 | A * | 12/1998 | Motoyama | 704/5 |
| 5,953,526 | A * | 9/1999 | Day et al. | 717/108 |
| 5,987,256 | A * | 11/1999 | Wu et al. | 717/146 |
| 6,028,605 | A * | 2/2000 | Conrad et al. | 345/840 |
| 6,175,845 | B1 * | 1/2001 | Smith et al. | 707/521 |
| 6,202,072 | B1 * | 3/2001 | Kuwahara | 707/500 |
| 6,226,675 | B1 * | 5/2001 | Meltzer et al. | 370/466 |
| 6,263,332 | B1 * | 7/2001 | Nasr et al. | 707/104.1 |
| 6,301,621 | B1 * | 10/2001 | Haverstock et al. | 345/963 |
| 6,336,124 | B1 * | 1/2002 | Alam et al. | 707/523 |
| 6,377,956 | B1 * | 4/2002 | Hsu et al. | 707/100 |
| 6,381,743 | B1 * | 4/2002 | Mutschler, III | 717/104 |
| 6,470,349 | B1 * | 10/2002 | Heninger et al. | 707/102 |
| 6,523,172 | B1 * | 2/2003 | Martinez-Guerra et al. | 717/143 |

(Continued)

OTHER PUBLICATIONS

Anonymous, "Adobe Submits Proposal to Improve Quality of Web Graphics with IBM, Netscape, and Sun", Apr. 13, 1998, World Wide Web Consortium (W3C), pp. 1-3.*

(Continued)

*Primary Examiner*—Sanjiv Shah
(74) *Attorney, Agent, or Firm*—Duke W. Yee; Jeffrey S. LaBaw; Wing Yan Mok

(57) ABSTRACT

A method and apparatus for converting programs and source code files written in a programming language to equivalent markup language files is provided. The conversion may be accomplished by a static process or by a dynamic process. In a static process, a programming source code file is converted by an application to a markup language file. A document type definition file for a markup language is parsed; a source code statement from a source code file is parsed; an element defined in the document type definition file is selected based on an association between the element and an identifier of a routine in the source code statement; and the selected element is written to a markup language file. In a dynamic process, the program is executed to generate the markup language file that corresponds to the source code file or presentation steps of the program. The application program is executed; a document type definition file for a markup language is provided as input; an element defined in the document type definition file is selected based on a routine called by the application program; and the selected element is written to a markup language file.

13 Claims, 19 Drawing Sheets

U.S. PATENT DOCUMENTS

| | | | | |
|---|---|---|---|---|
| 2002/0002566 | A1 * | 1/2002 | Gajraj | 707/513 |
| 2002/0023110 | A1 * | 2/2002 | Fortin et al. | 707/513 |

OTHER PUBLICATIONS

Cover, Robin, "The XML Cover Pages", IBM and Adobe Collaborate on Web Publishing Technology, Nov. 16, 1998, pp. 1-3.*

Roberts, Mark, "Graphic Element Markup", May 1999, http://www.infoloom.com/gcaconfs/WEB/grandada99/robm.HTM, pp. 1-26.*

Villacis et al., "A Web Inteface to Parallel Program Source Code Archetypes", 1995, ACM, Inc., pp. 1-16.*

Precision Graphics Markup Language, World Wide Web Consortium Note, Apr. 10, 1998.

* cited by examiner

```
702 { <! ENTITY % base_content_model'(functionA | functionB)*'>

704 { <! ELEMENT plml % base_content_model;>

    { <! ELEMENT functionA EMPTY>
706 { <! ATTLIST functionA arg1 CDATA #REQUIRED
    {                      arg2 CDATA #REQUIRED
    { >

    { <! ELEMENT functionB EMPTY>
708 { <! ATTLIST functionB arg1 CDATA #REQUIRED
    { >
    { <! -- End of DTD for Programming Language Markup Language-->
```

FIG. 7

```
    {     { main programA (){
    { 802 { integer temp;
    {     {                   initProg ();
    {
800 { 804 {                     temp=functionA(5,7);
    {
    { 806 {                     temp=functionB(25);
    {
    {        }
```

FIG. 8

```
    { 902 { <? plml version = "1.0"?>
    {     { <! DOCTYPE plml SYSTEM "plml.dtd">
    {
    { 904 { <plml>
    {
    {     { <! -- main programA (){   --->
    { 906 { <! -- integer temp;       --->
    {     { <! -- initProg ();        --->
900 {
    { 908 { <functionA arg1="5"arg2="7" />
    {
    { 910 { <functionB arg1="25" />
    {
    { 912 { <! -- }                   --->
    {
    { 914 { </ plml>
```

FIG. 9A

```
920
  922 { <? plml version = "1.0"?>
        <! DOCTYPE plml SYSTEM "plml.dtd">
  924 { <plml>
  926 { <functionA arg1="5"arg2="7" />
  928 { <functionB arg1="25" />
  930 { </plml>
```
*FIG. 9B*
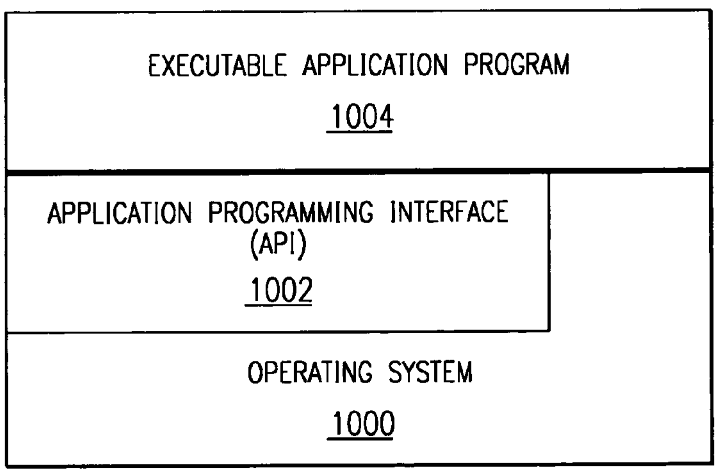
*FIG. 10A*
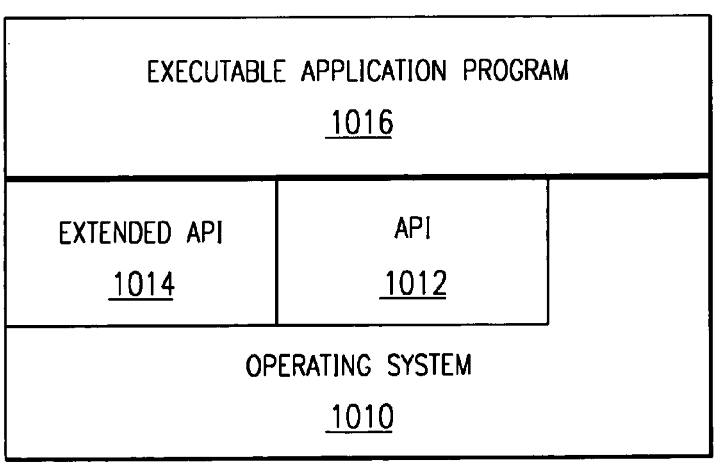
*FIG. 10B*

```
1400
  1402  public class JGML Graphics extends Graphics
  1404
        public void drawLine (int x1, int y1, int x2, int y2)
        {
  1406  Analyze JGML DTD for "drawLine" syntax
  1408  Generate JGML output statement with "drawLine" syntax and current parameters
  1410  printLine ("<drawLine x1=\""+x1+"\"y1=\""+y1+"\"x2=\""+x2
        +"\"y2=\""+y2+"\"/>");
        }

  1412  public void clearRect(int x, int y, int width, int height)
        {
          Analyze JGML DTD for "clearRect" syntax
          Generate JGML output statement with "clearRect" syntax and current parameters
          printLine (
          <clearRect x=\""+x+"\"y=\""+y+"\"width=\""+width+"\"height=\""+height+"\"/>);
        }
```

FIG. 14

```
<!-- Java Graphics Markup Language (JGML) Document Type Definition (DTD) -->
<!ENTITY % base_content_model
    '(copyArea | drawLine | fillRect | drawRect | clearRect |
        drawRoundRect | fillRoundRect | draw3Drect | fill3Drect |
        drawOval | fillOval | drawArc | fillArc | drawPolyline |
        drawPolygon | fillPolygon | drawString | drawChars |
        drawBytes | drawImage | dispose | finalize | clipRect |
        setClip | setColor | setPaintMode | translate | setXORMode |
        setFont)*'
>
<!ELEMENT jgml %base_content_model;>
<!ELEMENT copyArea          EMPTY>
<!ATTLIST
    copyArea                x         CDATA        #REQUIRED
                            y         CDATA        #REQUIRED
                            width     CDATA        #REQUIRED
                            height    CDATA        #REQUIRED
                            dx        CDATA        #REQUIRED
                            dy        CDATA        #REQUIRED
>
<!ELEMENT drawLine          EMPTY>
<!ATTLIST
    drawLine                x1        CDATA        #REQUIRED
                            y1        CDATA        #REQUIRED
                            x2        CDATA        #REQUIRED
                            y2        CDATA        #REQUIRED
>
<!ELEMENT fillRect          EMPTY>
<!ATTLIST
    fillRect                x         CDATA        #REQUIRED
                            y         CDATA        #REQUIRED
                            width     CDATA        #REQUIRED
                            height    CDATA        #REQUIRED
>
<!ELEMENT drawRect          EMPTY>
<!ATTLIST
    drawRect                x         CDATA        #REQUIRED
                            y         CDATA        #REQUIRED
                            width     CDATA        #REQUIRED
                            height    CDATA        #REQUIRED
>
<!ELEMENT clearRect         EMPTY>
<!ATTLIST
    clearRect               x         CDATA        #REQUIRED
                            y         CDATA        #REQUIRED
                            width     CDATA        #REQUIRED
                            height    CDATA        #REQUIRED
>
```

*FIG. 15A*

```
<!ELEMENT drawRoundRect        EMPTY>
<!ATTLIST
     drawRoundRect             x            CDATA          #REQUIRED
                               y            CDATA          #REQUIRED
                               width        CDATA          #REQUIRED
                               height       CDATA          #REQUIRED
                               arcWidth     CDATA          #REQUIRED
                               arcHeight    CDATA          #REQUIRED
>
<!ELEMENT fillRoundRect        EMPTY>
<!ATTLIST
     fillRoundRect             x            CDATA          #REQUIRED
                               y            CDATA          #REQUIRED
                               width        CDATA          #REQUIRED
                               height       CDATA          #REQUIRED
                               arcWidth     CDATA          #REQUIRED
                               arcHeight    CDATA          #REQUIRED
>
<!ELEMENT draw3DRect           EMPTY>
<!ATTLIST
     draw3dRect                x            CDATA          #REQUIRED
                               y            CDATA          #REQUIRED
                               width        CDATA          #REQUIRED
                               height       CDATA          #REQUIRED
                               raised       CDATA          #REQUIRED
>
<!ELEMENT fill3DRect           EMPTY>
<!ATTLIST
     fill3DRect                x            CDATA          #REQUIRED
                               y            CDATA          #REQUIRED
                               width        CDATA          #REQUIRED
                               height       CDATA          #REQUIRED
                               raised       CDATA          #REQUIRED
>
<!ELEMENT drawOval             EMPTY>
<!ATTLIST
     drawOval                  x            CDATA          #REQUIRED
                               y            CDATA          #REQUIRED
                               width        CDATA          #REQUIRED
                               height       CDATA          #REQUIRED
>
<!ELEMENT fillOval             EMPTY>
<!ATTLIST
     fillOval                  x            CDATA          #REQUIRED
                               y            CDATA          #REQUIRED
                               width        CDATA          #REQUIRED
                               height       CDATA          #REQUIRED
>
```

*FIG. 15B*

```
<!ELEMENT drawArc           EMPTY>
<!ATTLIST
    drawArc                 x            CDATA      #REQUIRED
                            y            CDATA      #REQUIRED
                            width        CDATA      #REQUIRED
                            height       CDATA      #REQUIRED
                            startAngle   CDATA      #REQUIRED
                            arcAngle     CDATA      #REQUIRED
>
<!ELEMENT fillArc           EMPTY>
<!ATTLIST
    fillArc                 x            CDATA      #REQUIRED
                            y            CDATA      #REQUIRED
                            width        CDATA      #REQUIRED
                            height       CDATA      #REQUIRED
                            startAngle   CDATA      #REQUIRED
                            arcAngle     CDATA      #REQUIRED
>
<!ELEMENT drawPolyLine      EMPTY>
<!ATTLIST
    drawPolyLine            xPoints      CDATA      #REQUIRED
                            yPoints      CDATA      #REQUIRED
                            nPoints      CDATA      #REQUIRED
>
<!ELEMENT drawPolygon       EMPTY>
<!ATTLIST
    drawPolygon             xPoints      CDATA      #IMPLIED
                            yPoints      CDATA      #IMPLIED
                            nPoints      CDATA      #IMPLIED
                            p            CDATA      #IMPLIED
>
<!ELEMENT fillPolygon       EMPTY>
<!ATTLIST
    fillPolygon             xPoints      CDATA      #IMPLIED
                            yPoints      CDATA      #IMPLIED
                            nPoints      CDATA      #IMPLIED
                            Polygon      CDATA      #IMPLIED
>
<!ELEMENT drawString        EMPTY>
<!ATTLIST
    drawString              str          CDATA      #REQUIRED
                            x            CDATA      #REQUIRED
                            y            CDATA      #REQUIRED
>
```

*FIG. 15C*

```
<!ELEMENT drawChars          EMPTY>
<!ATTLIST
     drawChars               data        CDATA     #REQUIRED
                             offset      CDATA     #REQUIRED
                             length      CDATA     #REQUIRED
                             x           CDATA     #REQUIRED
                             y           CDATA     #REQUIRED
>
<!ELEMENT drawBytes          EMPTY>
<!ATTLIST
     drawBytes               offset      CDATA     #REQUIRED
                             length      CDATA     #REQUIRED
                             x           CDATA     #REQUIRED
                             y           CDATA     #REQUIRED
>
<!ELEMENT drawImage          EMPTY>
<!ATTLIST
     drawImage               img         CDATA     #REQUIRED
                             x           CDATA     #IMPLIED
                             y           CDATA     #IMPLIED
                             width       CDATA     #IMPLIED
                             height      CDATA     #IMPLIED
                             dx1         CDATA     #IMPLIED
                             dy1         CDATA     #IMPLIED
                             dx2         CDATA     #IMPLIED
                             dy2         CDATA     #IMPLIED
                             sx1         CDATA     #IMPLIED
                             sy1         CDATA     #IMPLIED
                             sx2         CDATA     #IMPLIED
                             sy2         CDATA     #IMPLIED
                             bgcolor     CDATA     #IMPLIED
                             observer    CDATA     #REQUIRED
>
<!ELEMENT dispose            EMPTY>
<!ELEMENT finalize           EMPTY>
<!ELEMENT clipRect           EMPTY>
<!ATTLIST
     clipRect                x           CDATA     #REQUIRED
                             y           CDATA     #REQUIRED
                             width       CDATA     #REQUIRED
                             height      CDATA     #REQUIRED
>
```

*FIG. 15D*

```
<!ELEMENT setClip          EMPTY>
<!ATTLIST
     setClip               x          CDATA     #IMPLIED
                           y          CDATA     #IMPLIED
                           width      CDATA     #IMPLIED
                           height     CDATA     #IMPLIED
                           clip       CDATA     #IMPLIED
>
<!ELEMENT setColor         EMPTY>
<!ATTLIST
     setColor              color      CDATA     #REQUIRED
<!ELEMENT setPaintmode     EMPTY>
<!ELEMENT translate        EMPTY>
<!ATTLIST
     translate             x          CDATA     #REQUIRED
                           y          CDATA     #REQUIRED
>
<!ELEMENT setXORMode       EMPTY>
<!ATTLIST
     setXORMode            c1         CDATA     #REQUIRED
>
<!ELEMENT setFont          EMPTY>
<!ATTLIST
     setFont               font       CDATA     #REQUIRED
>
<!-- End of DTD for Java Graphics Markup Language -->
```

*FIG. 15E*

- clearRect (int, int, int, int) ,
  Clears the specified rectangle by filling it with the background color of the current drawing surface.
- clipRect (int, int, int, int)
  Intersects the current clip with the specified rectangle.
- copyArea (int, int, int, int, int, int)
  Copies an area of the component by a distance specified by dx and dy.
- create ( )
  Creates a new Graphics object that is a copy of this Graphics object.
- create (int, int, int int)
  Creates a new Graphics object based on this Graphics object, but with a new translation and clip area.
- dispose ( )
  Disposes of this graphics context and releases any system resources that it is using.
- draw3Drect (int, int, int, int, boolean)
  Draws a 3-D highlighted outline of the specified rectangle.
- drawArc (int, int, int, int, int, int)
  Draws the outline of a circular or elliptical arc covering the specified rectangle.
- drawBytes (byte[ ], int, int, int, int)
  Draws the text given by the specified byte array, using this graphics context's current font and color.
- drawChars (char[ ], int, int, int, int)
  Draws the text given by the specified character array, using this graphics context's current font and color.
- drawImage (Image, int, int, Color, ImageObserver)
  Draws as much of the specified image as is currently available.
- drawImage (Image, int, int, int, int, Color, ImageObserver)
  Draws as much of the specified image as has already been scaled to fit inside the specified rectangle.
- drawImage (Image, int, int, int, int, ImageObserver)
  Draws as much of the specified image as has already been scaled to fit inside the specified rectangle.
- drawImage (Image, int, int, int, int, int, int, int, int, Color, ImageObserver)
  Draws as much of the specified area of the specified image as is currently available, scaling it on the fly to fit inside the specified area of the destination drawable surface.
- drawimage (Image, int, int, int, int, int, int, int, int, ImageObserver)
  Draws as much of the specified area of the specified image as is currently available, scaling it on the fly to fit inside the specified area of the destination drawable surface.

*FIG. 16A*

- drawLine (int, int, int, int)
  Draws a line, using the current color, between the points (x1, y1) and (x2, y2) in this graphics context" coordinate system.
- drawOval (int, int, int, int)
  Draws the outline of an oval.
- drawPolygon (int[ ], int[ ], int)
  Draws a closed polygon defined by arrays of x and y coordinates.
- drawPolygon (Polygon)
  Draws the outline of a polygon defined by the specified Polygon object.
- drawPolyline (int[ ], int[ ], int)
  Draws a sequence of connected lines defined by arrays of x and y coordinates.
- drawRect (int, int, int, int)
  Draws the outline of the specified rectangle.
- drawRoundRect (int, int, int, int, int, int)
  Draws an outlined round-cornered rectangle using this graphics context's current color.
- drawString (String, int, int)
  Draws the text given by the specified string, using this graphics context's current font and color.
- fill3Drec (int, int, int, int, boolean)
  Paints a 3-D highlighted rectangle filled with the current color.
- fillArc (int, int, int, int, int, int)
  Fills a circular or elliptical arc covering the specified rectangle.
- fillOval (int, int, int, int)
  Fills an oval bounded by the specified rectangle with the current color.
- fillPolygon (int[ ], int[ ], int)
  Fills a closed polygon defined by arrays of x and y coordinates.
- fillPolygon (Polygon)
  Fills the polygon defined by the specified Polygon object with the graphics context's current color.
- fillRect (int, int, int, int)
  Fills the specified rectangle.
- fillRoundRect (int, int, int, int, int, int)
  Fills the specified rounded corner rectangle with the current color.
- finalize ( )
  Disposes of this graphics context once it is no longer referenced.
- getClip ( )
  Gets the current clipping area.

*FIG. 16B*

- getClipBounds ( )
  Returns the bounding rectangle of the current clipping area.
- getClipRect ( )
  Deprecated.
- getColor ( )
  Gets this graphics context's current color.
- getFont ( )
  Gets the current font.
- getFontMetrics ( )
  Gets the font metrics of the current font.
- getFontMetrics (Font)
  Gets the font metrics for the specified font.
- setClip (int, int, int, int)
  Sets the current clip to the rectangle specified by the given coordinates.
- setClip (Shape)
  Sets the current clipping area to an arbitrary clip shape.
- setColor (Color)
  Sets this graphics context's current
- setFont (Font)
  Sets this graphics context's font to the specified font.
- setPaintMode ( )
  Sets the paint mode of this graphics context to overwrite the destination with this graphics context's current color.
- setXORMode (Color)
  Sets the paint mode of this graphics context to alternate between this graphics context's current color and the new specified color.
- toString ( )
  Returns a String object representing this Graphics object's value.
- translate (int, int)
  Translates the origin of the graphics context to the point (x, y) in the current coordinate system.

*FIG. 16C*

```
1700
1702 { <! ELEMENT drawLine EMPTY>

1706 { <! ATTLIST drawLine x1 CDATA #REQUIRED
                           x2 CDATA #REQUIRED
                           y1 CDATA #REQUIRED
                           y2 CDATA #REQUIRED
       >

1704 { <! ELEMENT clearRect EMPTY>

1708 { <! ATTLIST clearRect x CDATA #REQUIRED
                            y CDATA #REQUIRED
                        width CDATA #REQUIRED
                       height CDATA #REQUIRED
       >
```

*FIG. 17*

```
1800
1802 ~ drawLine (23, 43, 50, 60);
1804 ~ drawLine (50, 60, 27, 80);
1806 ~ clearRect (0, 0, 10, 10);
```

*FIG. 18*

```
1900
       <? xml version="1.0" ?>
       <! DOCTYPE jgml SYSTEM "jgml.dtd" >
       < jgml >
1902 ~ < drawLine x1="23" y1="43" x2="50" y2="60" />
1904 ~ < drawLine x1="50" y1="60" x2="27" y2="80" />
1906 ~ < clearRect x="0" y="0" width="10" height="10" />
       < /jgml >
```

*FIG. 19*

METHOD AND APPARATUS FOR CONVERTING PROGRAMS AND SOURCE CODE FILES WRITTEN IN A PROGRAMMING LANGUAGE TO EQUIVALENT MARKUP LANGUAGE FILES

CROSS-REFERENCE TO RELATED APPLICATIONS

The present application is related to application Ser. No. 09/306,198, filed Apr. 30, 1999, entitled "Method and Apparatus for Converting Application Programming Interfaces Into Equivalent Markup Language Elements," hereby incorporated by reference.

BACKGROUND OF THE INVENTION

1. Technical Field

The present invention relates generally to an improved data processing system, and, in particular, to a method and apparatus for converting a program or source code file from a programming language to a markup language.

2. Description of Related Art

The World Wide Web (WWW, also known simply as "the Web") is an abstract cyberspace of information that is physically transmitted across the hardware of the Internet. In the Web environment, servers and clients communicate using Hypertext Transport Protocol (HTTP) to transfer various types of data files. Much of this information is in the form of Web pages identified by unique Uniform Resource Locators (URLs) or Uniform Resource Identifiers (URIs) that are hosted by servers on Web sites. The Web pages are often formatted using Hypertext Markup Language (HTML), which is a file format that is understood by software applications, called Web browsers. A browser requests the transmission of a Web page from a particular URL, receives the Web page in return, parses the HTML of the Web page to understand its content and presentation options, and displays the content on a computer display device. By using a Web browser, a user may navigate through the Web using URLs to view Web pages.

As the Web continues to increase dramatically in size, companies and individuals continue to look for ways to enhance its simplicity while still delivering the rich graphics that people desire. Although HTML is generally the predominant display format for data on the Web, this standard is beginning to show its age as its display and formatting capabilities are rather limited. If someone desires to publish a Web page with sophisticated graphical effects, the person will generally choose some other data format for storing and displaying the Web page. Sophisticated mechanisms have been devised for embedding data types within Web pages or documents. At times, an author of Web content may create graphics with special data types that require the use of a plug-in.

The author of Web content may also face difficulties associated with learning various data formats. Moreover, many different languages other than HTML exist for generating presentation data, such as page description languages. However, some of these languages do not lend themselves to use on the Web. Significant costs may be associated with mastering all of these methods.

On the other hand, the application programming interfaces (APIs) of certain operating system environments or programming environments are well-known. Persons who write programs for these APIs have usually mastered the display spaces and methods of these APIs.

A standard has been proposed for Precision Graphics Markup Language (PGML), which is an extensible Markup Language (XML) compatible markup language. This standard attempts to bridge the gap between markup languages and page description languages. Markup languages provide flexibility and power in structuring and transferring documents yet are relatively limited, by their generalized nature, in their ability to provide control over the manner in which a document is displayed. PGML incorporates the imaging model common to the PostScript® language and the Portable Document Format (PDF) with the advantages of XML. However, PGML does not tap the existing skills of programmers who are very knowledgeable about the syntax of many different programming languages which are used to define and implement graphical presentation capabilities on various computer platforms.

Therefore, it would useful to have a method for adapting well-known APIs in some manner for use as a Web-based page description language. It would be particularly advantageous for the method to provide the ability to produce documents that conform with evolving markup language processing standards.

SUMMARY OF THE INVENTION

The present invention provides a method and apparatus for converting programs and source code files written in a programming language to equivalent markup language files. The conversion may be accomplished by a static process or by a dynamic process. In a static process, a programming source code file is converted by an application to a markup language file. A document type definition file for a markup language is parsed; a source code statement from a source code file is parsed; an element defined in the document type definition file is selected based on an association between the element and an identifier of a routine in the source code statement; and the selected element is written to a markup language file. In a dynamic process, the program is executed to generate the markup language file that corresponds to the source code file or presentation steps of the program. The application program is executed; a document type definition file for a markup language is provided as input; an element defined in the document type definition file is selected based on a routine called by the application program; and the selected element is written to a markup language file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an example of a DTD for the programming language markup language;

FIG. 8 is an example of a program in which the program is written in the programming language that may be expected within a programming language source code file;

FIGS. 9A and 9B are examples of generated markup language files;

FIGS. 10A–10B are block diagrams depicting software components within an executable environment that may support the execution of an application program;

FIG. 14 is an example of an extended graphics class;

FIGS. 15A–15E is an example of a DTD for the Java graphics markup language;

FIGS. 16A–16C is a list providing examples of methods within the graphics class that are supported within the Java graphics markup language DTD;

FIG. 17 is a portion of a Java graphics markup language DTD;

FIG. 18 is a portion of a Java program that invokes methods within the graphics class of a Java Virtual Machine; and FIG. 19 is an example of a markup language file that uses the Java Graphics Markup Language.

DETAILED DESCRIPTION OF THE PREFERRED EMBODIMENT

Figure 1:
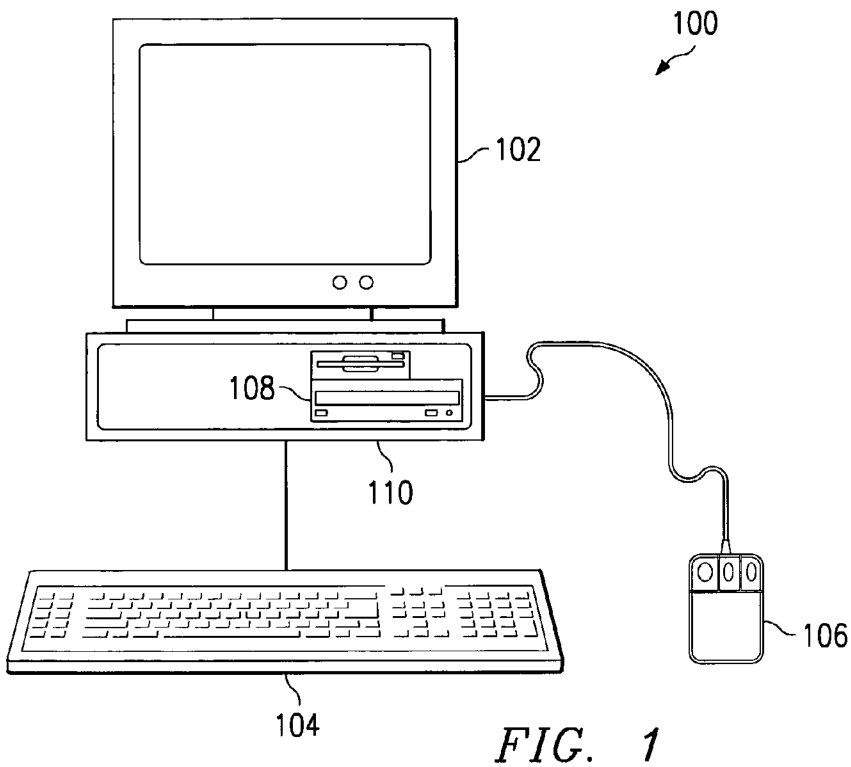
FIG. 1 is a pictorial representation depicting a data processing system in which the present invention may be implemented in accordance with a preferred embodiment of the present invention.

With reference now to the figures, FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

Figure 2:
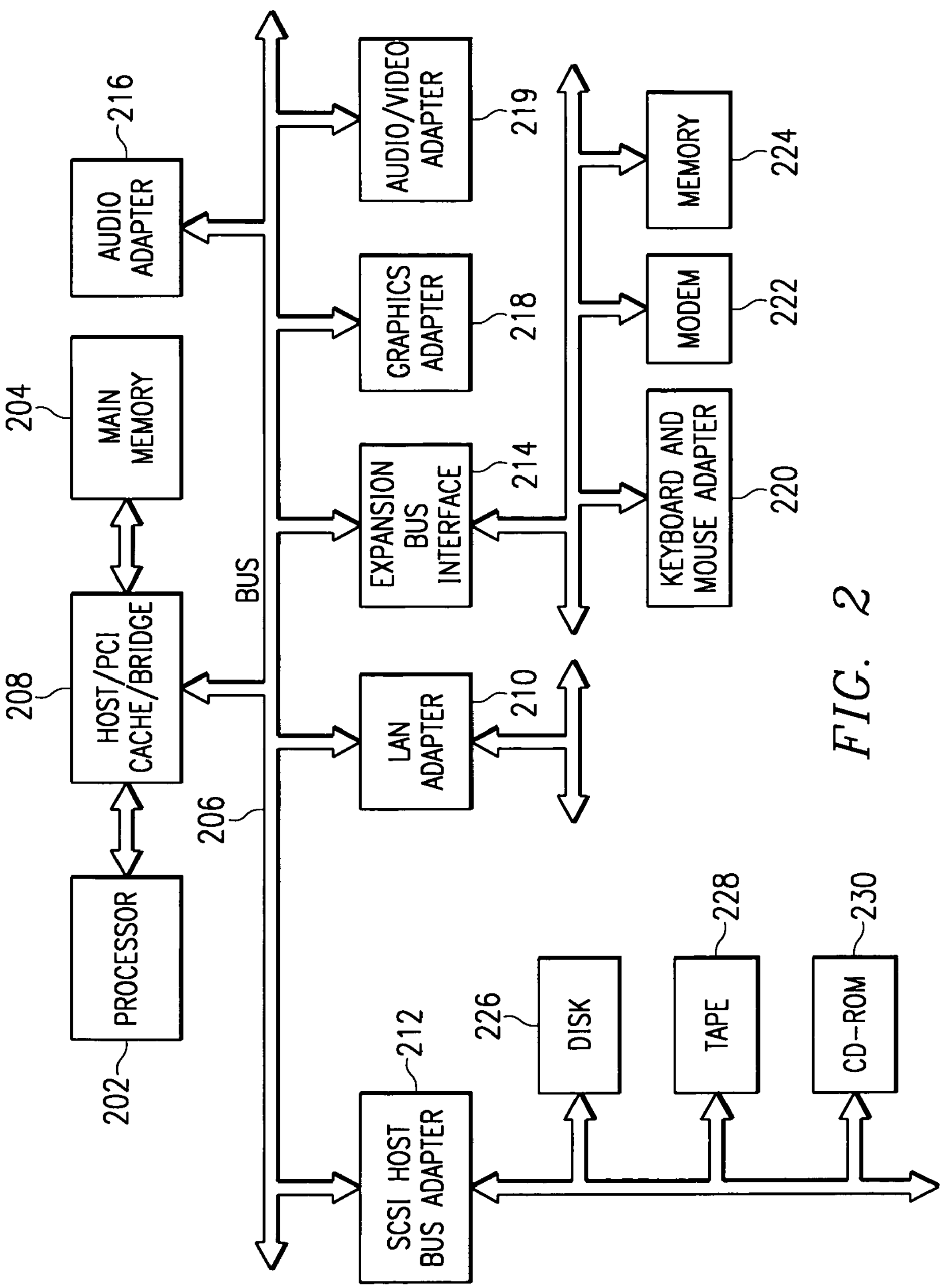
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

Figure 3:
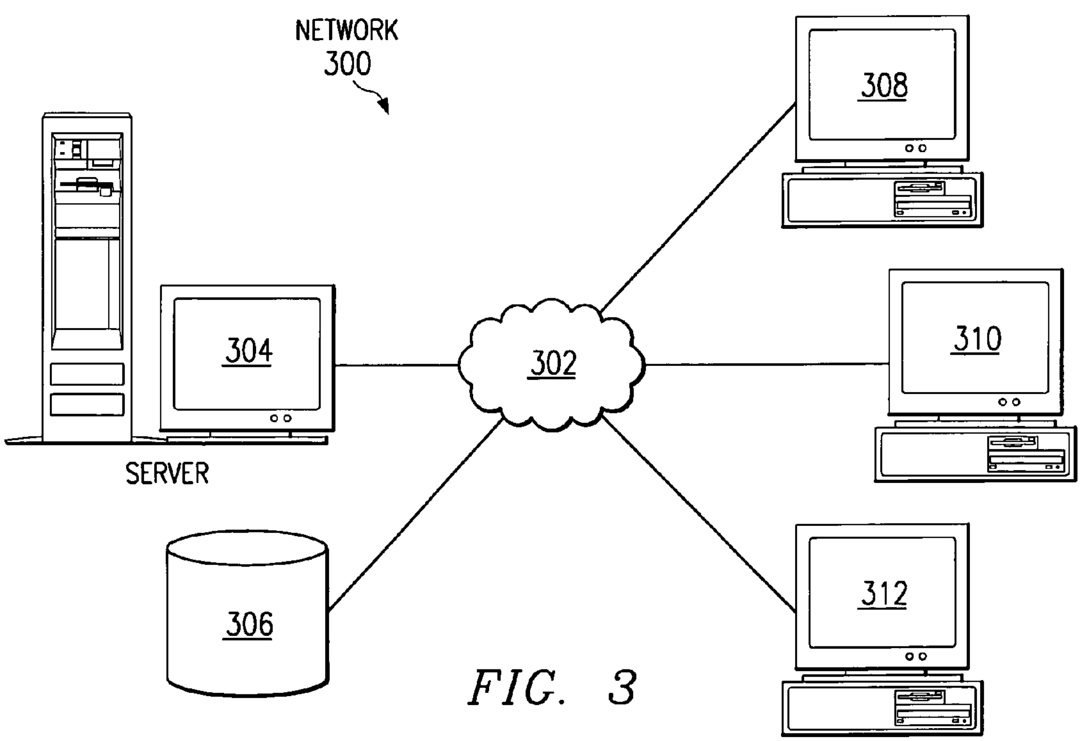
FIG. 3 is a block diagram depicting a pictorial representation of a distributed data processing system in which the present invention may be implemented.

With reference now to FIG. 3, a block diagram depicts a pictorial representation of a distributed data processing system in which the present invention may be implemented. Distributed data processing system 300 is a network of computers in which the present invention may be implemented. Distributed data processing system 300 contains a network 302, which is the medium used to provide communications links between various devices and computers connected together within distributed data processing system 300. Network 302 may include permanent connections, such as wire or fiber optic cables, or temporary connections made through telephone connections.

In the depicted example, a server 304 is connected to network 302 along with storage unit 306. In addition, clients 308, 310, and 312 also are connected to a network 302. These clients 308, 310, and 312 may be, for example, personal computers or network computers. For purposes of this application, a network computer is any computer, coupled to a network, which receives a program or other application from another computer coupled to the network. In the depicted example, server 304 provides data, such as boot files, operating system images, and applications to clients 308–312. Clients 308, 310, and 312 are clients to server 304. Distributed data processing system 300 may include additional servers, clients, and other devices not shown. In the depicted example, distributed data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 300 also may be implemented as a number of different types of networks, such as for example, an intranet, a local area network (LAN), or a wide area network (WAN). FIG. 3 is intended as an example, and not as an architectural limitation for the present invention.

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources, usually identified by a Uniform Resource Locator (URL). A URL is a special syntax identifier defining a communications path to specific information. Each logical block of information accessible to a client, called a "page" or a "Web page", is identified by a URL.

The URL provides a universal, consistent method for finding and accessing this information, not necessarily for the user, but mostly for the user's Web "browser". A browser is a software application for requesting and receiving content from the Internet or World Wide Web. Usually, a browser at a client machine, such as client 308 or data processing system 200, submits a request for information identified by a URL. Retrieval of information on the Web is generally accomplished with an HTML-compatible browser. The Internet also is widely used to transfer applications to users using a browser. With respect to commerce on the Web, consumers and businesses use the Web to purchase various goods and services. In offering goods and services, some companies offer goods and services solely on the Web while others use the Web to extend their reach.

Figure 4A:
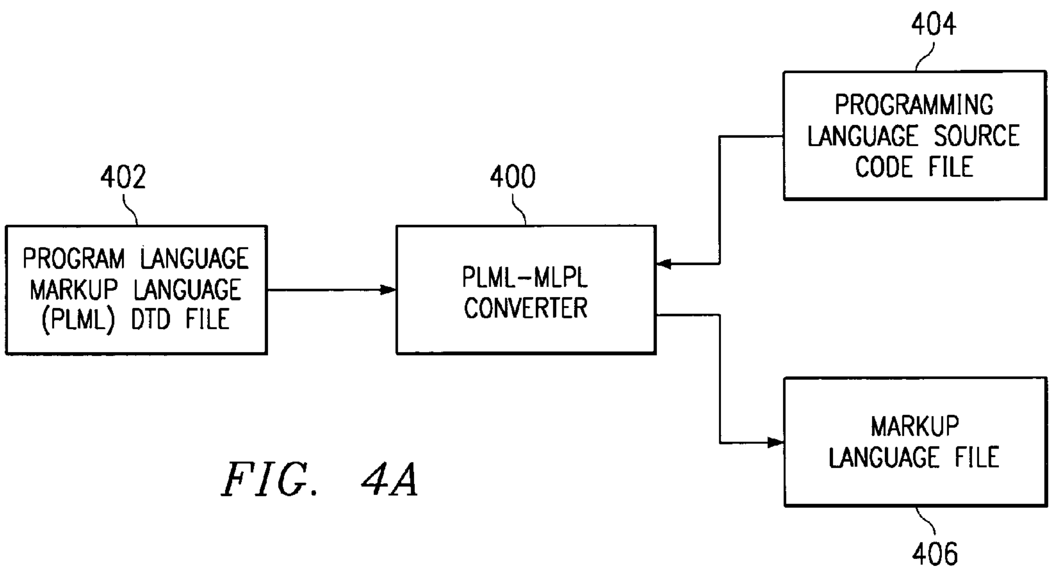
FIGS. 4A–4B is a block diagram depicting a system for converting between programming language source code files and markup language files.
Figure 4B:
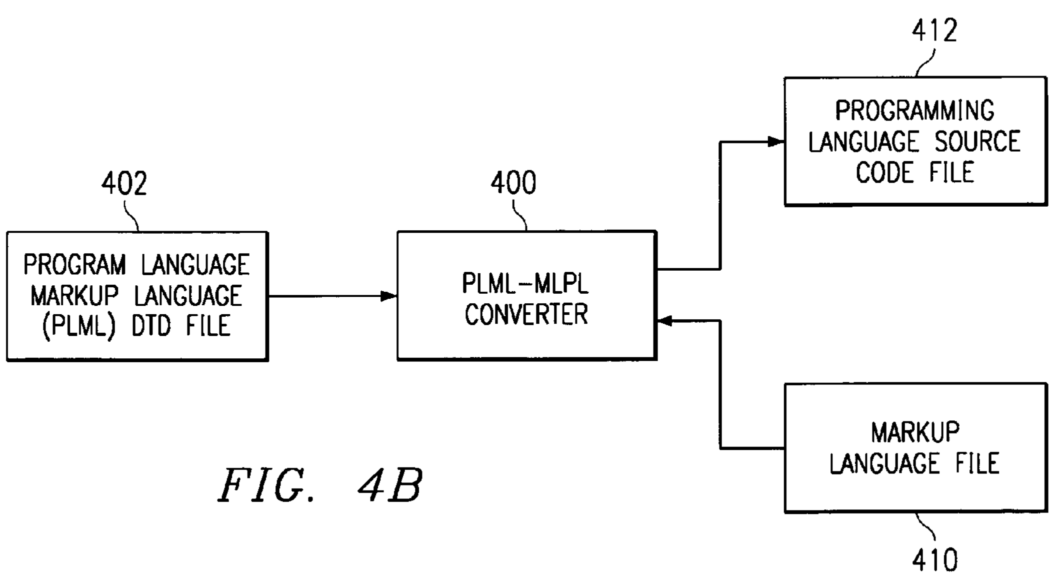

With reference now to FIGS. 4A–4B, a block diagram depicts a system for converting between programming language source code files and markup language files. Converter 400 provides functionality for converting between program language source code files and markup language files. Converter 400 accepts as input a Program Language Markup Language (PLML) Document Type Definition (DTD) file.

A DTD file contains the rules for applying markup language to documents of a given type. It is expressed by markup declarations in the document type declaration. The declaration contains or points to markup declarations that provide a grammar for a class of documents. The document type declaration can point to an external subset (a special kind of external entity) containing markup declarations, or can contain the markup declarations directly in an internal subset, or can do both. The DTD for a document consists of both subsets taken together. In other words, a DTD which provides a grammar, a body of rules about the allowable ordering of a document's "vocabulary" of element types, is found in declarations within a set of internal and external sources. In some instances, the DTD for a particular document may be included within the document itself.

Although the examples are provided using XML (extensible Markup Language), certain other markup languages that are compatible with the Standard Generalized Markup Language (SGML) family of languages may be used to implement the present invention. The SGML-compatible language should offer Document Type Definition (DTD) support so that the syntax and meaning of the tags within the system may be flexibly changed. The input file does not necessarily have to be a DTD as long as the input file has the ability to flexibly specify the grammar or syntax constructs of a language for input into the converter. For example, although Hypertext Markup Language (HTML) is within the SGML family of languages, it does not offer DTD support and does not have the flexibility necessary for the present invention.

PLML is an XML-compatible language for a particular type of programming language. Multiple DTDs may be specified so that a data processing system has at least one DTD per programming language.

More information about XML may be found in DuCharme, *XML: The Annotated Specification,* January 1999, herein incorporated by reference.

In the example of FIG. 4A, converter 400 references PLML DTD file 402 as an external entity. Converter 400 uses the grammar in PLML DTD file 402 to generate a file that is consistent with the grammar within PLML DTD file 402.

Converter 400 also accepts as input a programming language source code file that contains programming language statements that are to be converted or translated. Using PLML DTD file 402 as a guide for translating programming language statements in programming language source code file 404, converter 400 generates markup language file 406, which is essentially a markup language document.

Each markup language document has both a logical and a physical structure. Physically, the document is composed of units called entities. An entity may refer to other entities to cause their inclusion in the document. Logically, the document is composed of declarations, elements, comments, character references, and processing instructions, all of which are indicated in the document by explicit markup. Converter 400 may output a markup language document that consists of a single entity or file or, alternatively, multiple entities in multiple files. Examples of a DTD, source code file, and markup language file are further described below.

FIG. 4B shows PLML-MLPL converter 400 operating in a "reverse" manner with respect to FIG. 4A. Converter 400 accepts PLML DTD file 402 as input in a manner similar to FIG. 4A. However, in this example, converter 400 accepts markup language file 410 as input and generates programming language source code file 412 as output. Converter 400 is able to "reverse" the direction of inputs and outputs based on the association between a programming language and a markup language provided by the PLML DTD file. The association between the programming language and the markup language through the DTD file is described in more detail further below.

Converter 400 may operate in one of two manners. In the first method, a static conversion process may read programming language source code file 404 or markup language file 410, depending on the direction of the conversion, and parse each statement within the input files on an individual basis. In the second method, a dynamic conversion process executes programming language source code file 404 in an interpretive process that generates markup language output as a consequence of the execution of the programming language code. Alternatively, converter 400 provides a special execution environment for dynamically converting the calls within an executable file compiled from programming language source code file 404. Each of these methods of conversion are explained in further detail below.

Figure 5:
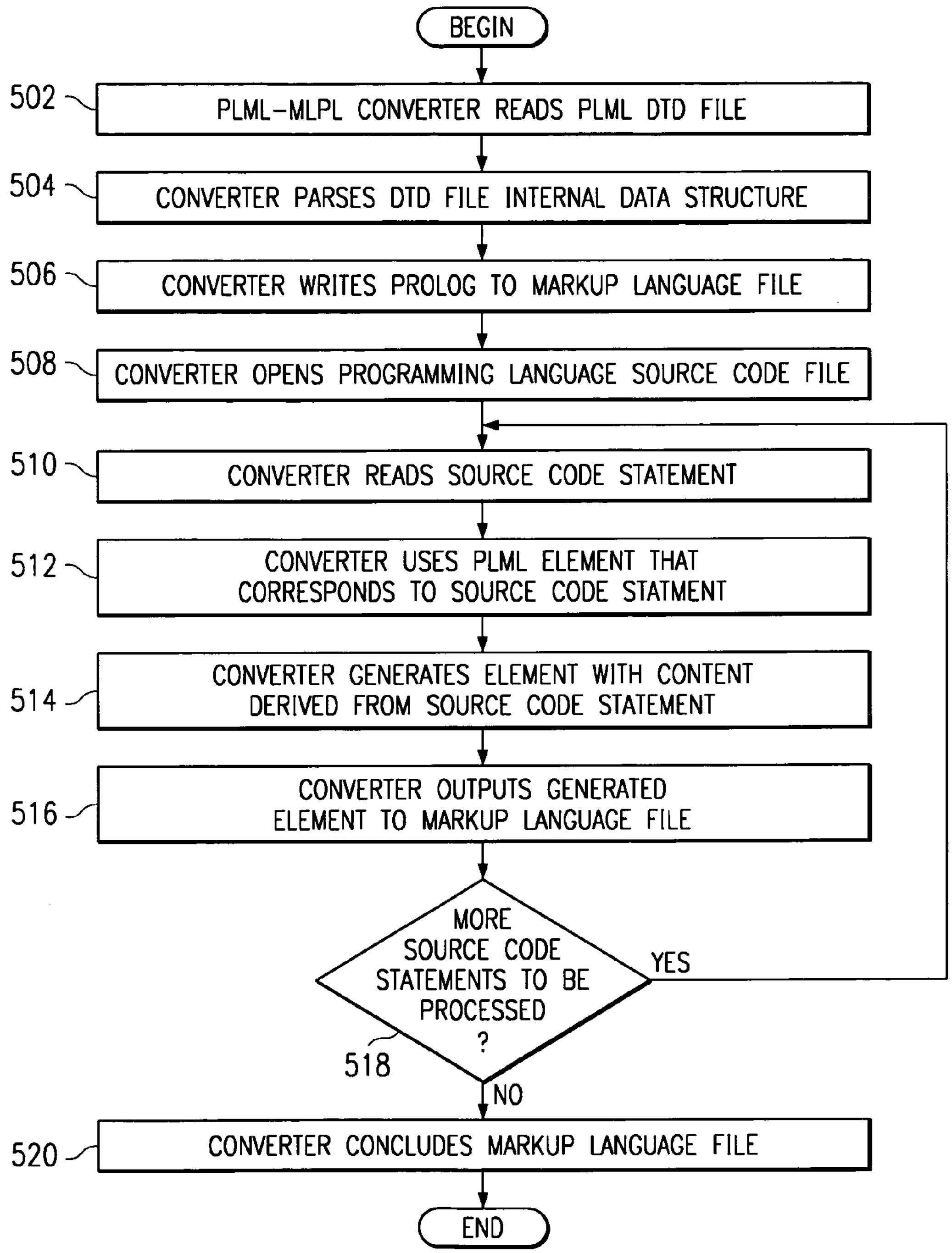
FIG. 5 is a flowchart depicting a process for converting a programming language source code file to a markup language file.

With reference now to FIG. 5, a flowchart depicts a process for converting a programming language source code file to a markup language file. The method depicted in FIG. 5 is similar to that described with respect to FIG. 4A. The process begins with PLML-MLPL converter reading the PLML DTD file (step 502). The converter parses the DTD file into an internal data structure (step 504). Parsing a DTD into an internal data structure such as an object tree is well known in the art. The converter opens a markup language file and writes a prolog to the markup language file (step 506). The converter then opens the programming language source code file in order to obtain programming language source code statements that will be converted to markup language statements (step 508).

The converter then reads a source code statement (step 510) and uses the PLML element in the previously generated internal data structure that corresponds to the function, method, procedure, or API within the source code statement (step 512). An API is one or more routines, subroutines, functions, methods, procedures, libraries, classes, object-oriented objects, or other callable or invokable software objects used by an application program or other software object to direct the performance of procedures by the computer's operating system or by some other software object. Using the information in the corresponding PLML element, the converter generates an element with content derived from the source code statement (step 514). The content is derived from the source code statement by parsing the source code statement according to well known methods in the art. The converter then outputs the generated markup language element to the markup language file (step 516). A determination is then made as to whether more source code statements are in the programming language source code file that need to be processed into markup language statements (step 518). If so, then the process branches back to step 510 to repeat the process for another source code statement. If not, then the converter concludes the markup language file by writing the appropriate terminating tags or information (step 520).

Figure 6:
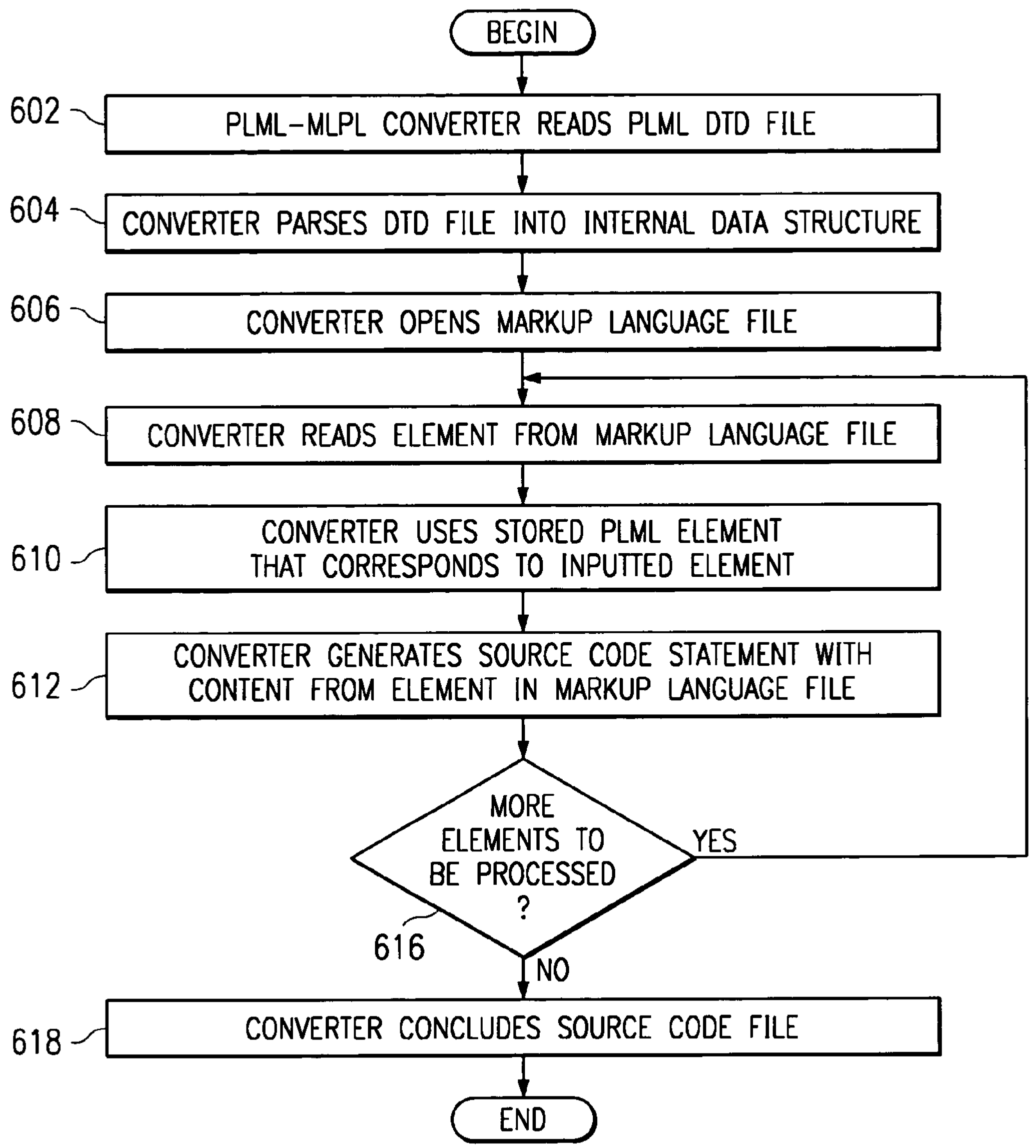
FIG. 6 is a flowchart depicting a process for converting a markup language file into a programming language source code file.

With reference now to FIG. 6, a flowchart depicts a process for converting a markup language file into a programming language source code file. The process depicted in FIG. 6 is similar to the process discussed with respect to FIG. 4B. The process begins with the PLML converter reading the PLML DTD file (step 602). The converter parses the DTD file into internal data structures, such as an object tree representing the hierarchy of the elements within the DTD file (step 604). The converter then opens the markup language file in order to use the markup language file as a source of input for generation of the programming language source code file (step 606).

The converter reads an element from the markup language file (step 608) and uses the stored PLML element within the internal data structure that corresponds to the inputted element from the markup language file that is currently being processed (step 610). Using the previously stored, corresponding PLML element with its associated information concerning the correspondence between PLML elements and source code statements, the converter generates a source code statement with content from the element currently being processed (step 612). The converter then outputs the generated source code statement to the source code file (step 614). A determination is then made as to whether there are other elements within the markup language file that need to be processed (step 616). If so, then the process branches back to step 608 and repeats the process for another element within the markup language file. If not, then the converter concludes the source code file (step 618).

With reference now to FIG. 7, an example of a DTD for the programming language markup language is provided. Entity 702 provides a root entity for a PLML document. Element 704 provides a root element for a PLML document. Element 706 provides a markup language element that corresponds to a functionA that may be expected to be found within a programming language source code file. Element 706 for functionA also shows arg1 and arg2 as the arguments that may be expected to be found in a source code statement when a source code statement is parsed and found to contain a call to functionA. The CDATA attribute type is a character string attribute type that, in this case, is required to be found in a markup language element for functionA. Element 706 is written in such a way that arg1 and arg2 must appear as attribute types describing the corresponding function call arguments for a source code statement that contains a call to functionA. Element 708 is similar to element 706. Element 708 provides for the element within a markup language file that corresponds to a call to functionB within a source code statement that may be expected to be found in a programming language source code file. Element 708 contains a CDATA attribute type named arg1 for providing the argument value of the argument in the source code statement containing a call to functionB.

With reference now to FIG. 8, an example of a program is provided in which the program is written in the programming language that may be expected within a programming language source code file. Program 800 contains a simple program of a few statements. Statements 802 are initial program statements that commence and initiate the body of the program. Statement 804 contains a call to functionA and statement 806 contains a call to functionB in a manner which corresponds to the declaration of elements 706 and 708 in FIG. 7.

With reference now to FIGS. 9A and 9B, examples of generated markup language files are provided. These markup language files may have been generated using a process similar to that described in FIGS. 4A and 5. A PLML DTD file, similar to that shown in FIG. 7, may have been used as input to a converter that read a programming language source code file, similar to that shown in FIG. 8, in order to generate the markup language shown as markup language statements 900 and 920 in the markup language files of FIGS. 9A and 9B.

Statements 902 provide the prolog for the markup language file or document. The prolog provides information about the document, such as the version of the markup language being used, the name of the file that contains the DTD, etc. Statement 904 is the start tag for the content of the markup language file. Statements 906 are comments which contain content that is identical to statements 802 in FIG. 8 that describe the declaration and initialization of the program shown within FIG. 8. Statement 908 provides an element for functionA that corresponds to the call to functionA in statement 804 in the program shown in FIG. 8. Statement 910 shows an element for functionB that corresponds to the call to functionB in the program of FIG. 8. Statements 908 and 910 also contain attributes providing the values of arguments that correspond to the values of the arguments in the function calls of the program in FIG. 8. Statement 912 contains the conclusion of the program in FIG. 8. Statement 914 provides the end tag for the content of the markup language file.

FIG. 9B shows an example of a markup language file that has been converted from program 800 shown in FIG. 8. The markup language file of FIG. 9B is similar to the markup language file of FIG. 9A except that the markup language file of FIG. 9B does not contain the declaration and initialization statements of computer program 800 as comment statements in the markup language file in a manner similar to those shown in FIG. 9A.

Statements 922 provide the prolog for the markup language file. Statement 924 provides the start tag for the content for the markup language file. Statement 926 provides an element and an attribute list for functionA similar to the call to functionA in computer program 800. Statement 928 provides an element and an attribute list for functionB similar to the call to functionB and statement 806 in computer program 800. Statement 930 provides the end tag to the markup language file.

The differences between FIGS. 9A and 9B are minor from the perspective of the markup language file. FIG. 9A contains additional comment statements that are not found in FIG. 9B. These comment statements do not affect the parsing of the markup language file. However, by placing some of the source code statements as comment statements in the markup language file, a converter which converts the markup language file to a programming language source code file in a "reverse" direction may use these comment statements to regenerate the majority of the program that was the origin for the markup language file. In other words, these comment statements may provide for a complete conversion cycle from a programming language source code file to a markup language file and back to a programming language source code file without the loss of any information necessary to compile the programming language source code file.

Rules for the inclusion of these other statements within a markup language file may be used to determine which portions of the original programming language source code file should be included during a conversion process to a markup language file. These rules may vary depending upon the programming language and the markup language being used in the conversion process. For example, statements 804 and 806 in FIG. 8 contain the use of a temporary variable named "TEMP". However, during the conversion process of computer program 800 into markup language file 900, information concerning the use of the temporary variable was dropped after a determination that inclusion of other information concerning the temporary variable was not necessary. Alternatively, the use of the temporary variable within computer program 800 may have been stored within additional comment statements in markup language file 900.

FIGS. 5 and 6 described a method for a static conversion process for programming language source code files and markup language files. As an alternative method, a converter may generate a markup language file using a dynamic conversion process that will be described with respect to FIGS. 10A–14.

With reference now to FIGS. 10A–10B, block diagrams depict software components within an executable environment that may support the execution of an application program. In FIG. 10A, operating system 1000 contains API 1002 that may be called by executable application program 1004 during the course of its execution. In this manner, executable application 1004 is supported by API 1002 and operating system 1000.

In FIG. 10B, operating system 1010 has API 1012 and extended API 1014 that may be called by executable application program 1016. Extended API 1014 may provide an API that is similar to API 1012 yet also provides additional capabilities that are not necessary in a standard execution environment. In this manner, executable application program 1016 may be supported during its execution of a dynamic conversion process that uses the additional functionality in extended API 1014.

Figure 11:
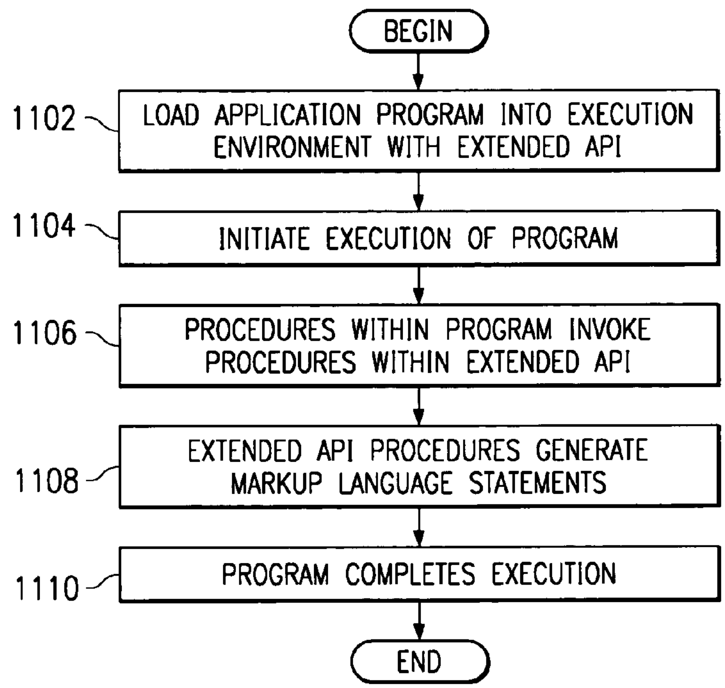
FIG. 11 is a flowchart depicting a process for dynamically converting a program into a markup language file.

With reference now to FIG. 11, a flowchart depicts a process for dynamically converting a program into a markup language file. The process begins when the application program is loaded into an execution environment with extended APIs (step 1102). The execution of the program is initiated (step 1104), and the procedures within the executing program invoke the procedures within or that constitute the extended API (step 1106). The extended API procedures then generate the markup language statements (step 1108). Steps 1106 and 1108 essentially describe steps that may be invoked multiple times during a process of generating markup language statements. The program then completes its execution (step 1110). In this manner, the executable program is allowed to execute in a normal fashion although within an environment with extended APIs. The extended APIs then provide the functionality for generating the markup language statements in a manner that is further described below.

Figure 12:
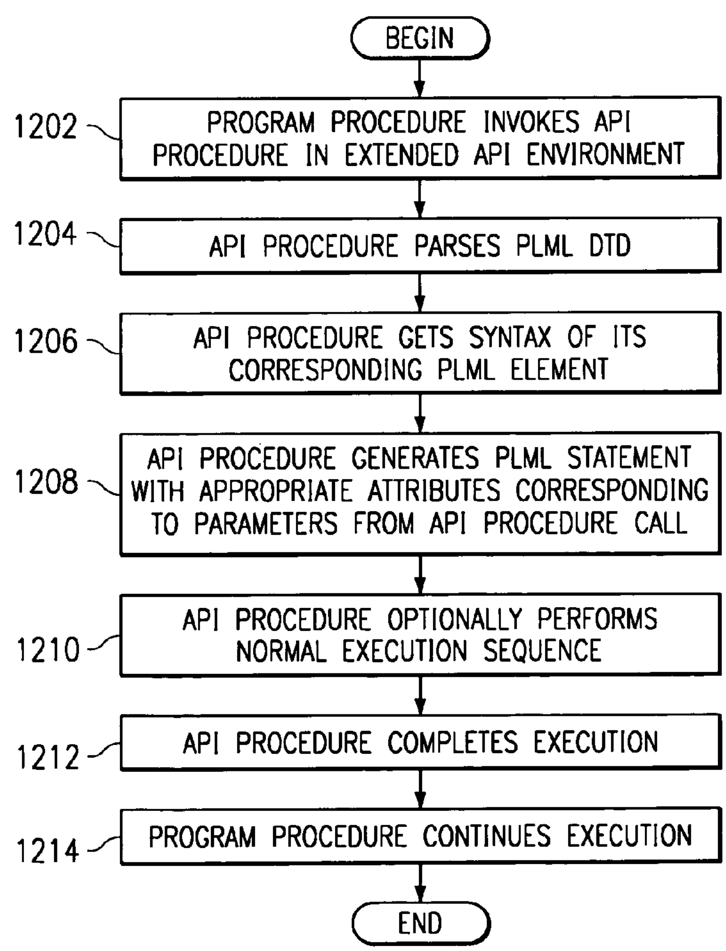
FIG. 12 is a flowchart depicting the process within an extended API for generating markup language statements.

With reference now to FIG. 12, a flowchart depicts the process within an extended API for generating markup language statements. The process begins when the executable program contains a procedure that calls the API procedure in the extended API environment (step 1202). Each API procedure within the extended API environment is responsible for parsing a PLML DTD (step 1204). In this case, the burden of locating the appropriate PLML element that corresponds to the API procedure is placed within the API procedure itself. The location of the PLML DTD file may be obtained through a global environment variable or some other well known method for providing global information to multiple procedures. Alternatively, the PLML DTD may have been parsed into an internal data structure, such as an object tree, and each API procedure is responsible for traversing the object tree or other internal data structure to locate the appropriate PLML element needed for the API procedure.

The API procedure then gets the syntax of its corresponding PLML element from the appropriate location (step 1206). The API procedure generates a PLML statement with appropriate attributes that correspond to the parameters that have been passed into the API procedure during the API procedure call (step 1208). Once the PLML statement is generated, the API procedure may optionally perform its normal execution sequence that would be found in the standard API without the extended API functionality for generating a markup language statement (step 1210). The API procedure then completes its execution (step 1212) and returns to the calling procedure of the executable program. The procedure within the executable program that invoked the API then continues with its execution within the normal control flow of the executable program (step 1214). In this manner, the executable program is not modified in order to produce the markup language output. The extended API provides an interface similar to the standard API while including additional functionality that generates the desired markup language output. This additional functionality is described in further detail with specific examples in FIGS. 13–19.

Figure 13:
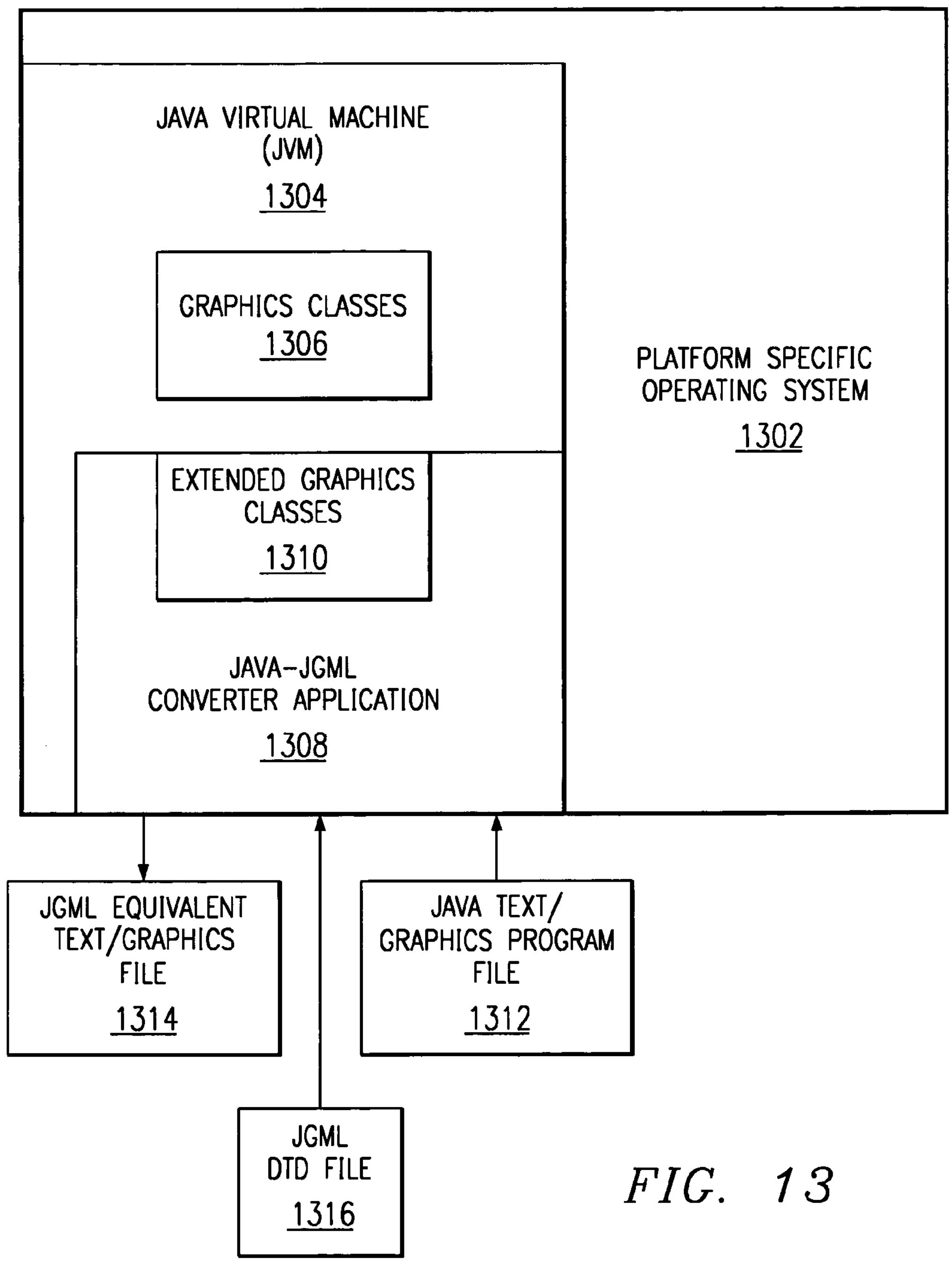
FIG. 13 is a block diagram depicting a Java run-time environment that includes a programming language to markup language converter application.

With reference now to FIG. 13, a block diagram depicts a Java run-time environment that includes a programming language to markup language converter application. System 1300 contains a platform specific operating system 1302 that supports the execution of Java Virtual Machine (JVM) 1304. JVM 1304 contains Graphics classes 1306 which is a set of classes that provide graphic contexts that allow an application to draw and paint images and graphical objects on various devices. The Graphics classes may be provided as part of the JDK AWT classes.

In this case, the system provides conversion from the Java programming language to the Java Graphics Markup Language (JGML). Java-JGML converter application 1308 runs within JVM 1304. Converter 1308 is written in the Java language and may be executed within JVM 1304 through interpretation or just-in-time compilation. Converter 1308 contains extended graphics classes 1310 that provide additional functionality to graphics classes 1306 in a manner similar to the components depicted in FIG. 10B and described in the methods of FIGS. 11–12. The technique of extending a Java class is well known in the art.

Converter application 1308 is written in the Java language yet converts a Java language program into an equivalent JGML file. In a static conversion process, converter 1308 reads Java text/graphics program file 1312 and parses the Java statements within the file in a manner similar to the process described with respect to FIGS. 4A and 5. JGML DTD file 1316 provides the grammar of the JGML that is required during the conversion process. Converter 1308 uses the DTD file and program file to generate JGML statements as output to JGML equivalent text/graphics file 1314.

When converter 1308 is used to convert a Java program to a markup language file in a static conversion process, converter 1308 does not require the additional functionality provided within extended graphics classes 1310. Converter 1308 steps through the Java language statements in program file 1312 and generates equivalent markup language statements that are placed into markup language file 1314.

Alternatively, converter 1308 may dynamically convert the Java language statements in program file 1312 into markup language statements in markup language file 1314 in a manner similar to that described in FIGS. 4B, 6, 10B, 11, and 12. In a dynamic conversion process within system 1300, JVM 1304 may load the Java program within Java program file 1312 in combination with extended graphics classes 1310. Extended graphics classes 1310 may be loaded simultaneously with the Java program in program file 1312 or may be included within program file 1312 as a separate class or set of classes. JVM 1304 then interprets the loaded program in the standard manner. By providing the additional functionality of Java-to-JGML conversion within extended graphics classes 1310, the Java program within program file 1312 enables its own conversion to a markup language file. In this manner, the Java program within program file 1312 may be considered its own conversion application. This manner of execution is described in further detail with respect to FIGS. 14–19.

With reference now to FIG. 14, an example of an extended graphics class is provided. Extended graphics class 1400 is similar to the extended class depicted as extended graphics class 1310 in FIG. 13. Extended class 1400 provides portions of pseudocode that describe some of the functionality that may be required to convert a Java program. Line 1402 declares that the class extends the Graphics class within a Java Virtual Machine. Method 1404 provides functionality for a drawLine method that may be expected to be found within the graphics class within the JVM. In a manner similar to that described with respect to FIG. 12, the statements in method 1404 provide the functionality for generating the desired markup language statements. Line 1406 notes that each method within the extended class is responsible for parsing the JGML DTD for the proper syntax required by the method.

In this example, line 1406 notes that the drawLine method parses and analyzes the JGML DTD for the drawLine syntax. Line 1408 shows that a JGML output statement is constructed using the syntax for the drawLine method obtained from the JGML DTD and from the current parameters used by the invocation of method 1404. Line 1410 provides a pseudocode statement for outputting the JGML markup language statement to a markup language file.

Method 1412 contains similar pseudocode for generating markup language output for a clearRect method invocation. Extended class 1400 may contain many other examples of methods for converting Java language statements to markup language statements. The pseudocode within the methods of extended class 1400 may also be modified so that the methods do not analyze the DTD with each invocation but rather refer to a common or global, internal data structure that contains the syntax required for each element in the JGML grammar.

In general, the DTD need not contain equivalent elements for all the Java APIs. Generally, it is enough to have equivalent elements in the DTD corresponding to the abstract methods in the Java class. In the typical Java design, the other methods are internally coded in Java using the abstract methods. However, for securing a performance advantage and ease of programming in the markup language, the DTD may have some selected elements corresponding to non-abstract methods of Java also. By rewriting just the abstract methods of Java to generate the markup language, all the Java API's would automatically get converted to the markup language. FIGS. 16A, 16B, and 16C contain all the Java Graphics APIs—both abstract and non-abstract. The Java standard specifications indicate which of them are abstract and which are not. FIGS. 15A–E contain the DTD elements corresponding to almost all the abstract methods and some additional methods. In some cases, the DTD has merged several abstract methods, e.g., the drawImage methods, into one element. In certain cases, a few Java APIs may not need to be explicitly converted into markup language structures even if they are abstract, and they may be omitted from the markup language DTD. Hence, there is no need for the DTD and the list of Java APIs to be identical.

With reference now to FIGS. 15A–15E, an example of a DTD for the Java graphics markup language is provided. Each element within the DTD corresponds to a method within the Graphics class of the Abstract Windowing Toolkit (AWT) in the standard Java Virtual Machine.

With reference now to FIGS. 16A–16C, a list provides examples of methods within the graphics class that are supported within the Java graphics markup language DTD. A comparison of the methods listed in FIGS. 16A–16C and the elements in the Java graphics markup language DTD provides a correspondence between the methods and the elements so that the conversion of a Java language program, which contains these method calls, may be converted into appropriate elements within a markup language file.

With reference now to FIG. 17, a portion of a Java graphics markup language DTD is provided. Element 1702 provides the syntax for a drawLine element that corresponds to a drawLine function in the graphics class of a Java Virtual Machine. Element 1704 provides a clearRect element that corresponds to the clearRect method in the Graphics class of the Java Virtual Machine. Element 1702 has associated attribute list 1706 that provides the syntax for including the parameters for the drawLine method within the markup language file. Element 1704 has associated attribute list 1708 that provides the syntax for including the parameters for the clearRect method within the markup language file. The syntax of the portion of the DTD provided within FIG. 17 is similar to the syntax shown and explained with respect to FIG. 7.

With reference now to FIG. 18, a portion of a Java program that invokes methods within the graphics class of a Java Virtual Machine is provided. Statement 1802 invokes the drawLine method with four parameters. Statement 1804 invokes the drawLine method a second time also with four parameters. Statement 1806 invokes the clearRect method with four integer parameters. The portion of the Java program depicted within FIG. 18 is similar to the depiction of a program described with respect to FIG. 8.

With reference now to FIG. 19, an example of a markup language file that uses the Java Graphics Markup Language is provided. Markup language file 1900 has been generated with reference to the grammar for the JGLM elements shown as DTD portion 1700 in FIG. 17 and Java language statements 1800 in FIG. 18. Line 1902 corresponds to statement 1802 using the drawLine element 1702. Line 1904 corresponds to statement 1804 using the drawLine element shown as line 1702. Line 1906 corresponds to statement 1806 using element 1704 for the clearRect method invocation. JGML file 1900 may have been produced using DTD portion 1700 and program portion 1800 as inputs to a static conversion method or a dynamic conversion method as described above with respect to FIG. 13.

The advantages of the present invention should be apparent in light of the detailed description provided above. An application written in a programming language is translated or converted into a markup language document in accordance with a DTD written for this purpose. The original application may be converted statically by another application by translating source code statements to markup language statements. Alternatively, the original application is translated dynamically by executing the original application in an execution environment capable of translating API invocations to markup language statements. Once an application is written, the application may be translated to a markup language document without requiring the knowledge of markup language syntax. The generated document then contains the flexibility and power of an XML-compatible markup language document that ensures that the document is easily transferable and translatable yet contains graphical capabilities in a well-known syntax.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of dynamically translating an application program into a markup language file, the method comprising the computer-implemented steps of:

executing said application program;

parsing a document type definition file for a markup language;

during execution of said application program, selecting an element defined in the document type definition file based on a routine called by said application program; and writing the selected element to a markup language file to form a translation.

2. The method of claim 1 wherein the element comprises an attribute list corresponding to parameters for the routine.

3. The method of claim 1 wherein the selected element written to the markup language file comprises an attribute list corresponding to values for the parameters passed to the routine.

4. The method of claim 1 wherein the application program is written in Java programing language.

5. The method of claim 4 wherein the routine is an extended class method.

6. The method of claim 4 wherein the routine is a Graphics class method.

7. A data processing system for dynamically translating an application program into a markup language file, the data processing system comprising:

executing means for executing an application program;

parsing means for parsing a document type definition file for a markup language;

selecting means for selecting an element defined in the document type definition file based on a routine called by the application program; and writing means for writing the selected element to a markup language file to form a translation.

8. The data processing system of claim 7 wherein the element comprises an attribute list of parameters for the routine.

9. The data processing system of claim 7 wherein the selected element written to the markup language file comprises an attribute list of values for the parameters passed to the routine.

10. The data processing system of claim 7 wherein the application program is written in Java programming language.

11. The data processing system of claim 10 wherein the routine is an extended class method.

12. The data processing system of claim 10 wherein the routine is a Graphics class method.

13. A computer program product on a computer readable medium for use in a data processing system for dynamically translating an application program into a markup language file, the computer program product comprising:

first instructions for executing an application program;

second instructions for parsing a document type definition file for a markup language;

third instructions for selecting an element defined in the document type definition file based on a routine called by the application program; and fourth instructions for writing the selected element to a markup language file to form a translation.

* * * * *